United States Patent [19] [11] 4,401,511
Waldmeier [45] Aug. 30, 1983

[54] CONNECTING MEANS FOR INTERCONNECTING HOUSING MEMBERS OF CONJOINED CONDUCTOR RAIL SECTIONS

[76] Inventor: Hugues E. Waldmeier, 30, Rue d'Ottmarsheim, 68170 Rixheim, France

[21] Appl. No.: 263,933

[22] Filed: May 15, 1981

[30] Foreign Application Priority Data

May 20, 1980 [CH] Switzerland .................. 3905/80

[51] Int. Cl.³ .............................................. B60M 1/34
[52] U.S. Cl. .................................. 191/23 A; 191/30; 191/32; 191/35
[58] Field of Search .................... 191/23 R, 23 A, 30, 191/32, 35

[56] References Cited

U.S. PATENT DOCUMENTS 2,681,392  6/1954  Herrmann ........................ 191/23 A
2,838,620  6/1958  Herrmann ........................ 191/23 A
2,912,526  11/1959  Herrmann ........................ 191/23 A
3,995,725  12/1976  Howell ............................ 191/23 A
4,016,961  4/1977  Howell ............................ 191/23 A Primary Examiner—Richard A. Schacher
Attorney, Agent, or Firm—McGlew and Tuttle

[57] ABSTRACT

There is disclosed connecting means for releasable interconnection of two downwardly open housing members respectively of two conjoined sections of an electric current conductor rail. The connecting means comprises two shell elements, which are at least partially adapted to the external cross-sectional outline of the housing members and which leave free the downward openings of the housing members, and two screws for fastening the shell elements together. Each shell element is provided in its interior with two ribs which extend in respective cross-sectional planes of the shell element and which are engaged in corresponding grooves in the housing members thereby to prevent relative displacement of the housing members.

10 Claims, 2 Drawing Figures

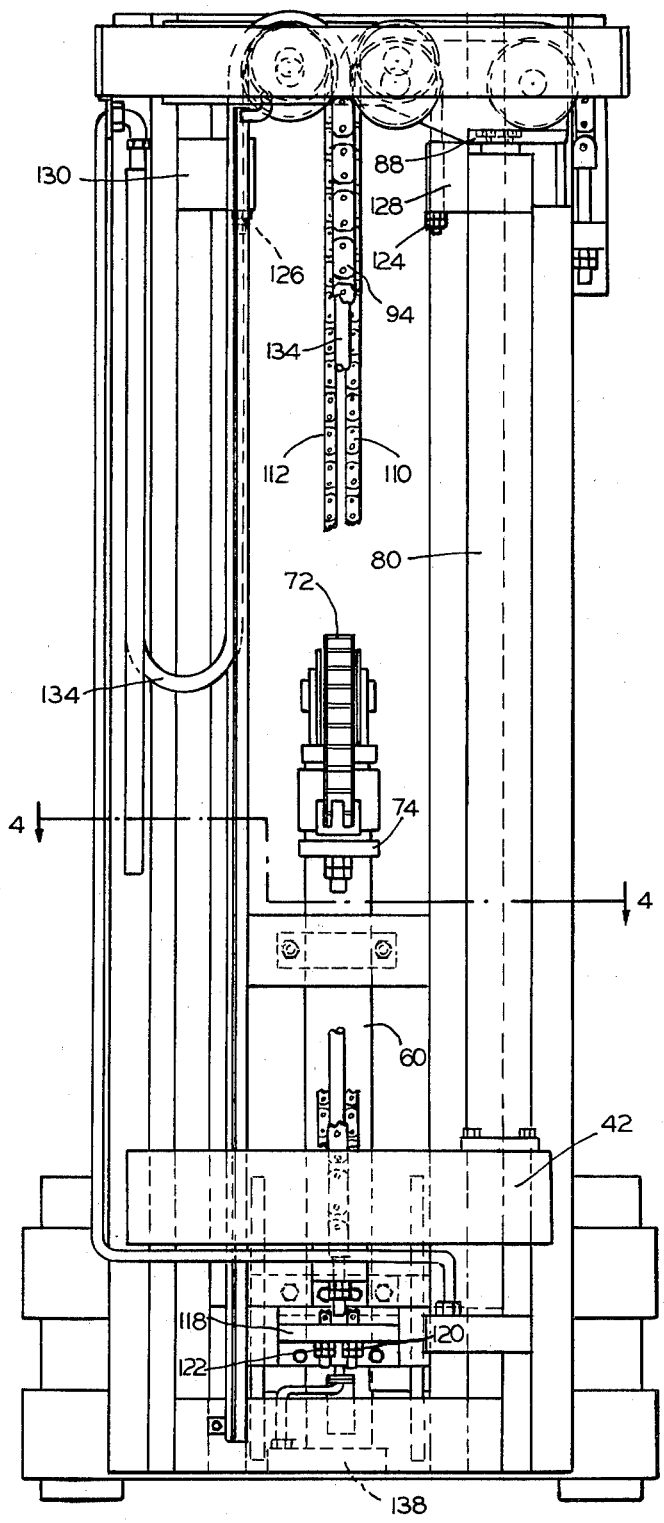

CONNECTING MEANS FOR INTERCONNECTING HOUSING MEMBERS OF CONJOINED CONDUCTOR RAIL SECTIONS

BACKGROUND OF THE INVENTION

The present invention relates to connecting means for releasable interconnection of two housing members respectively of two conjoined sections of an electric current conductor rail and to a conductor rail including such connecting means.

Such conductor rails are adapted to be wiped from below by current pick-up means of, for example, an electrically powered vehicle. The housing members enclose conductor means, for example metallic conductor strips, and are downwardly open so that the pick-up means can enter the housing members and electrically contact the conductor strips. The rail conventionally comprises a number of sections of convenient lengths which are conjoined in end-to-end relationship to form an entity. The conductor strips of the individual sections are joined together by suitable electrically conductive joining elements and the housing members, which are of electrically insulating material, should be connected together so as to be in a defined relationship and so that, in addition, the region of the conductor strip joining elements is covered.

OBJECTS OF THE INVENTION

It is therefore the principal object of the present invention to provide connecting means for connecting conductor rail housing members together, such connecting means being capable of economic manufacture, assembly in a simple manner, and reliable execution of their function, namely interconnection of the housing members to be substantially secure against relative rotation and relative lateral and axial displacement.

A supplementary and related object of the invention is the provision of connecting means of the kind described for covering the region of a coupling between current conductor means associated with such housing members, both to protect the coupling from damage or interference and to preclude accidental touching of electrically conducting parts not enclosed by the housing members.

Other objects and advantages of the invention will be apparent from the following description.

SUMMARY OF THE INVENTION

According to one aspect of the present invention there is provided connecting means for releasable interconnection of two correspondingly shaped, downwardly open housing members respectively of two conjoined sections of an electric current conductor rail, the connecting means comprising two shell elements which are interconnectible to enclose mutually adjacent end portions of the two housing members apart from the downward openings thereof, and fastening means for detachably fastening the shell elements together around such end portions. Each shell element has a cross-sectional shape which is at least partially adapted to the outline shape of a respective half of the housing member cross-section. In addition, each shell element is provided with at least two locating projections, for example ribs or spigots, which extend in respective cross-sectional planes of the shell element and which are engageable in corresponding recesses in the housing members to locate the members in a defined relationship.

In addition, according to a further aspect of the invention there is provided an electric current conductor rail comprising two correspondingly shaped, downwardly open housing members each forming part of a respective one of two conjoined sections of said rail, current conductor means extending in said housing members, and connecting means as described above releasably connecting the housing members together.

BRIEF DESCRIPTION OF THE DRAWINGS

An embodiment of the present invention will now be more particularly described by way of example and with reference to the accompanying drawings, in which:

FIG. 2 is a cross-section of the righthand half of the conductor rail of FIG. 1, the section being taken on the line II—II of FIG. 1.

Figure 1C:
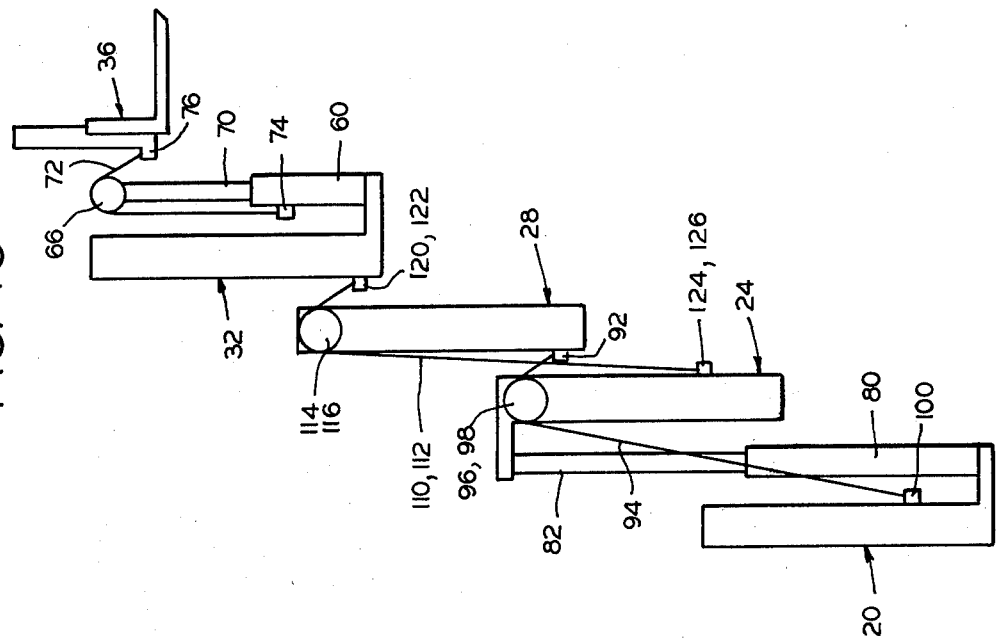
FIG. 1 is a schematic partly sectioned side elevation, in direction of arrow I of FIG. 2, of the adjoining end portions of two conjoined sections of a current conductor rail including housing member connecting means according to the said embodiment.

Referring now to the drawings, there are shown the adjoining end portions of two conjoined sections of an electric current conductor rail to be wiped from below by current pick-up means of currentconsuming means such as an electrically powered vehicle. Each rail section comprises a generally box-section housing member 1 of electrically insulating material defining an interior space, which is accessible through a downwardly facing opening 3 of the housing member, and an approximately Z-section metallic conductor strip 2 arranged in the interior space. Both the housing member 1 and the conductor strip 2 are of symmetrical cross-section with respect to the vertical medial plane shown in FIG. 2. Each vertical wall (only one of which is shown in FIG. 2) of the interior space is provided with a groove and an adjoining rib, the rib projecting between adjacent lateral web portions of the Z-section conductor strip 2 and the groove receiving an outwardly angled end portion of one of such web portions. By this means, each conductor strip 2 is firmly mounted in the interior space of the respective housing member 1 and can be contacted at its lowermost surface, which is inwardly curved, by the afore-mentioned current pick-up means so that current conduction can take place from the conductor strip to the pick-up means. Instead of contacting the conductor strip directly, the pick-up means can contact a supplementary conductor member (not shown) arranged below the conductor strip and held at its edge portions in horizontal grooves (only one of which is shown) in the housing members.

Figure 1A:
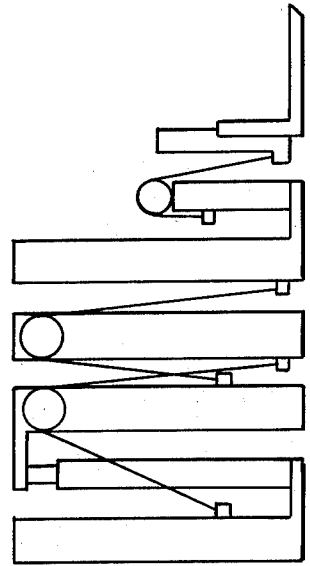
Figure 1B:
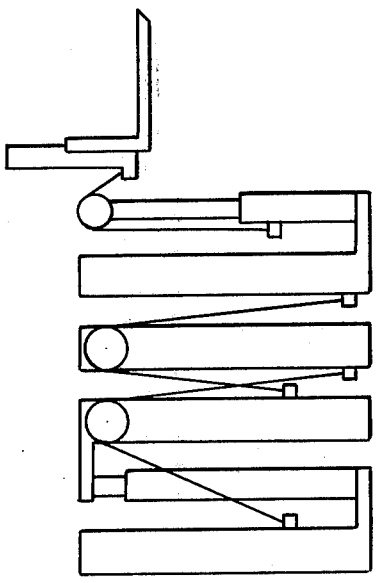
Figure 3:
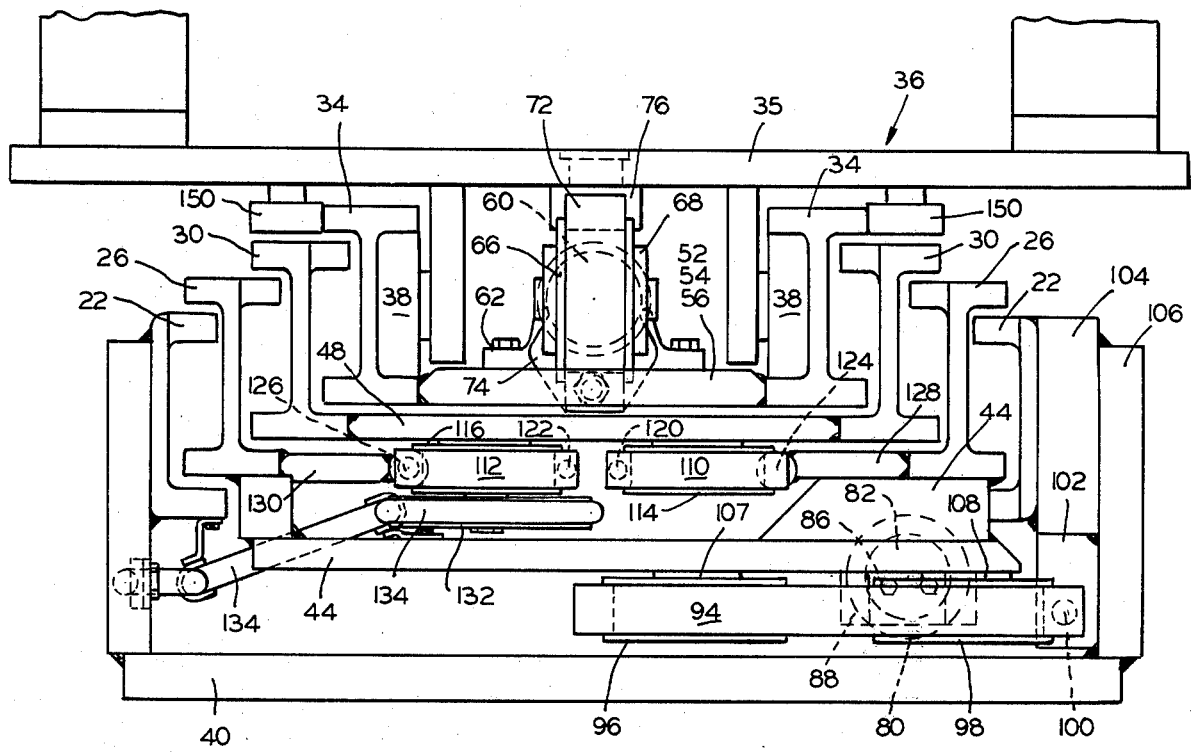
Figure 4:
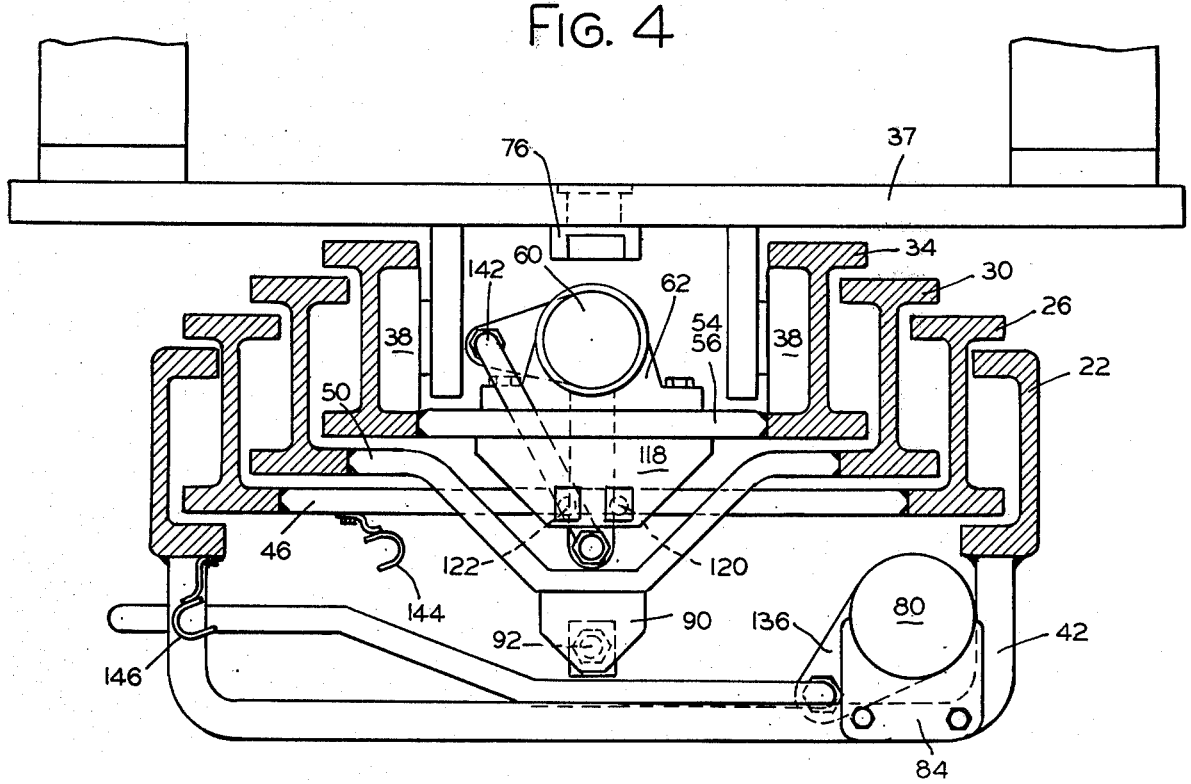
Figure 6:
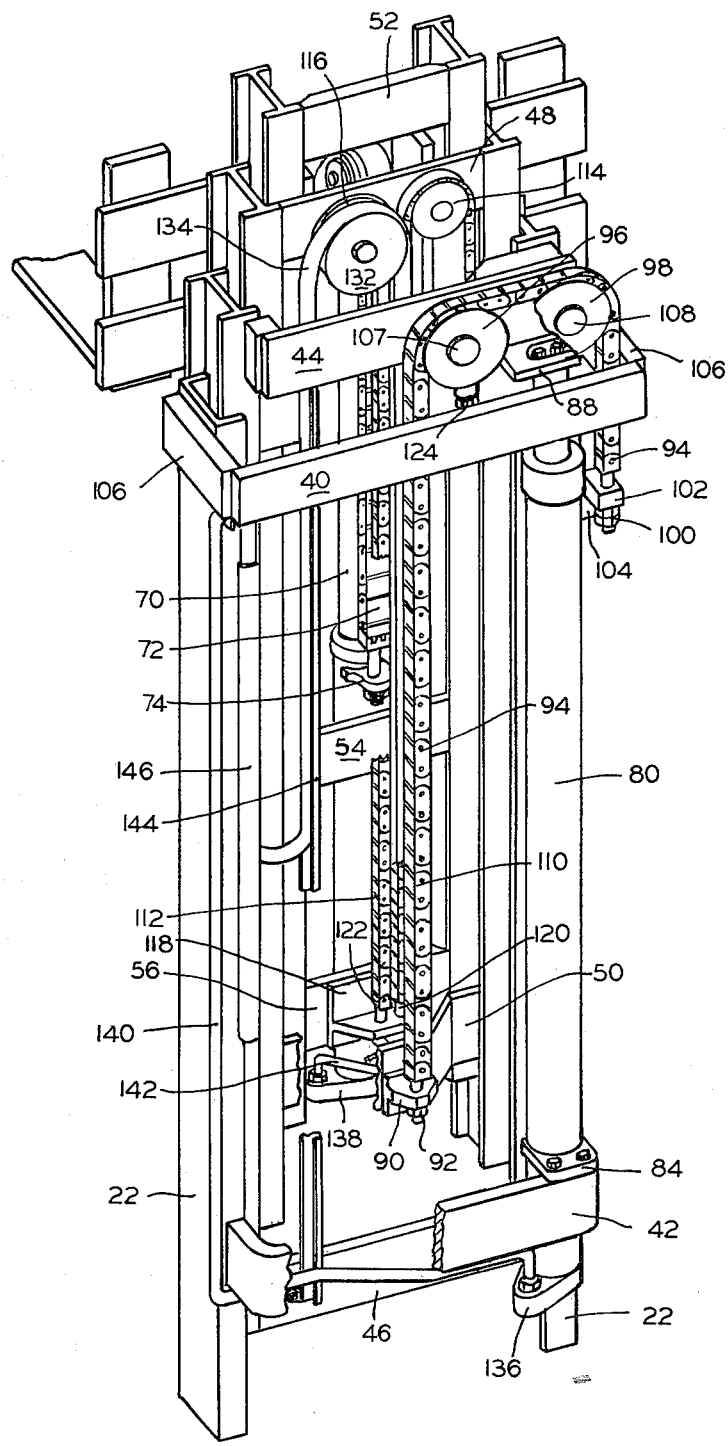
Figure 7:
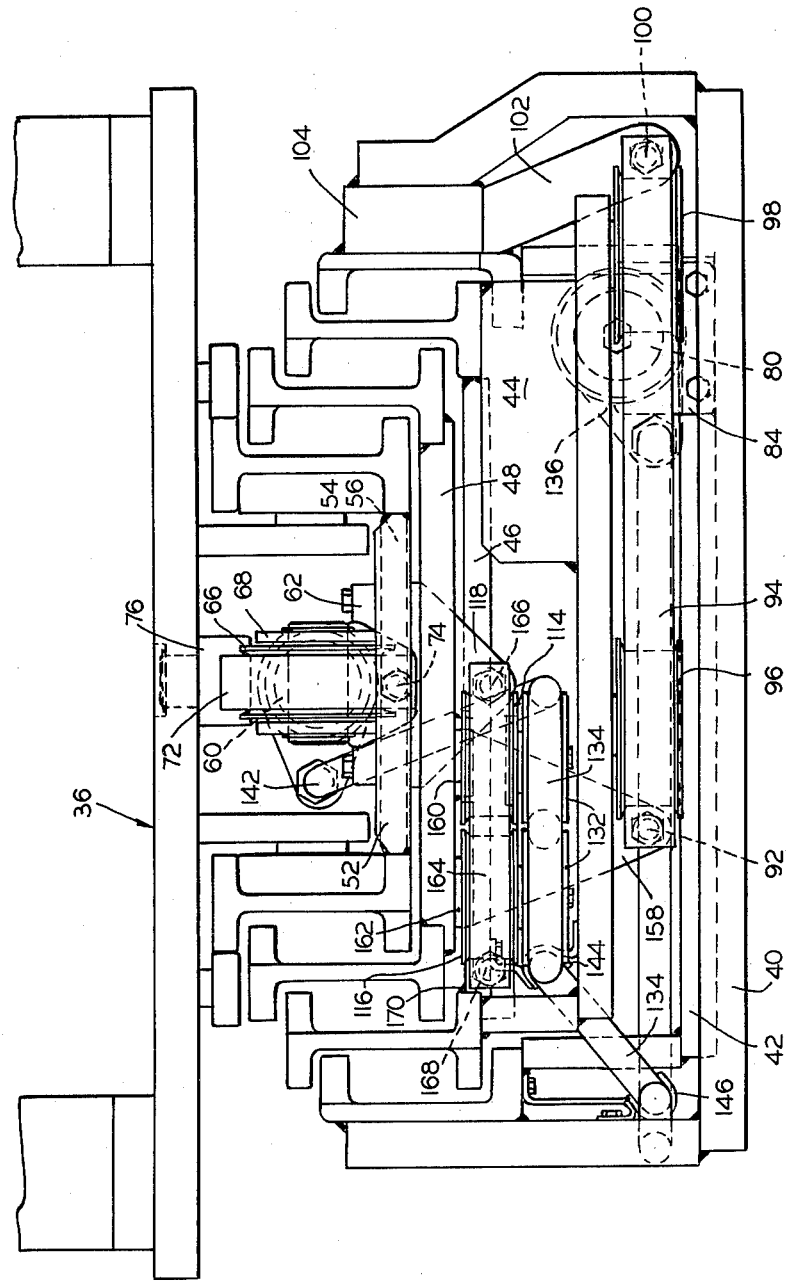
Figure 8:
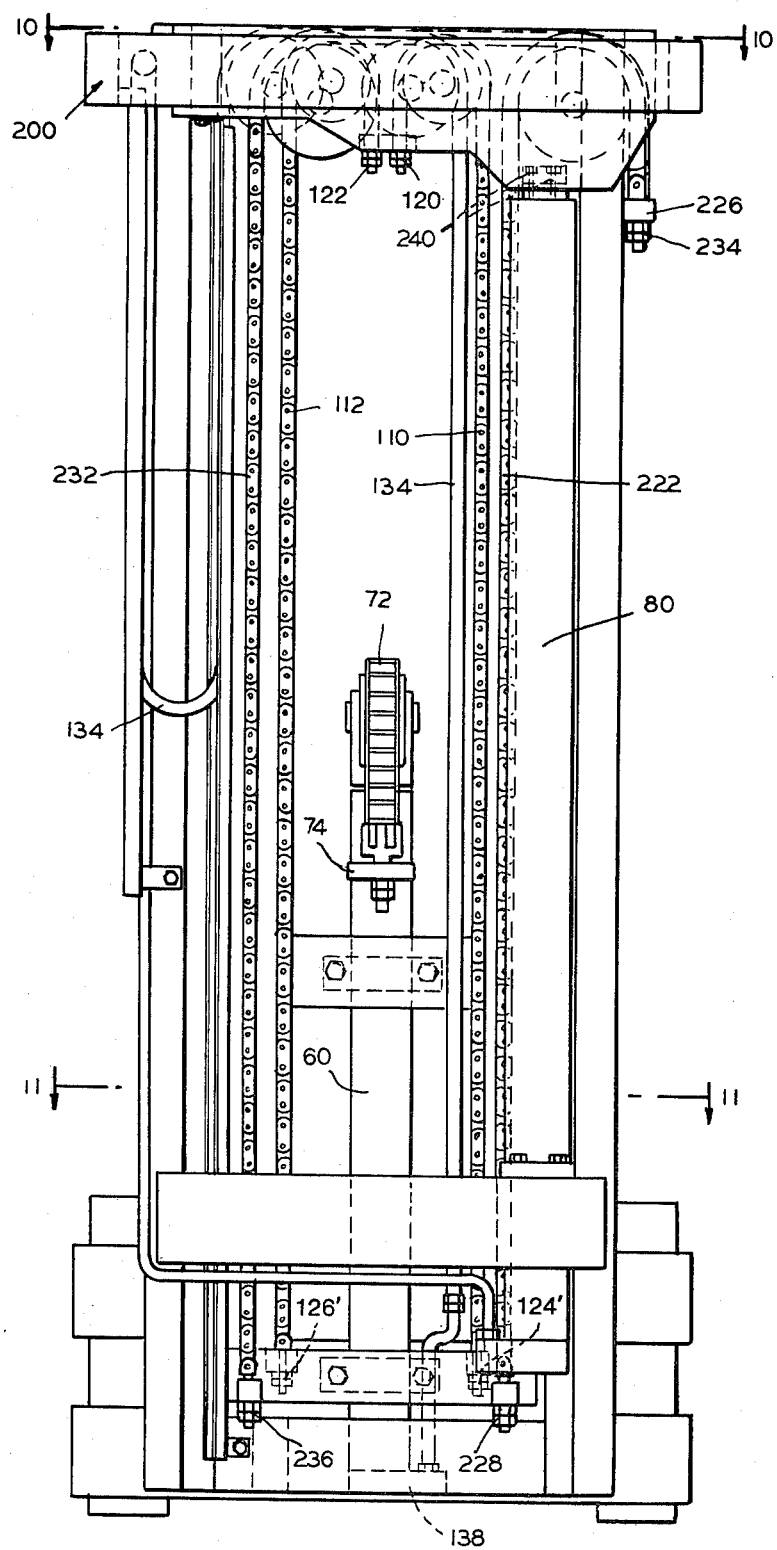
Figure 9:
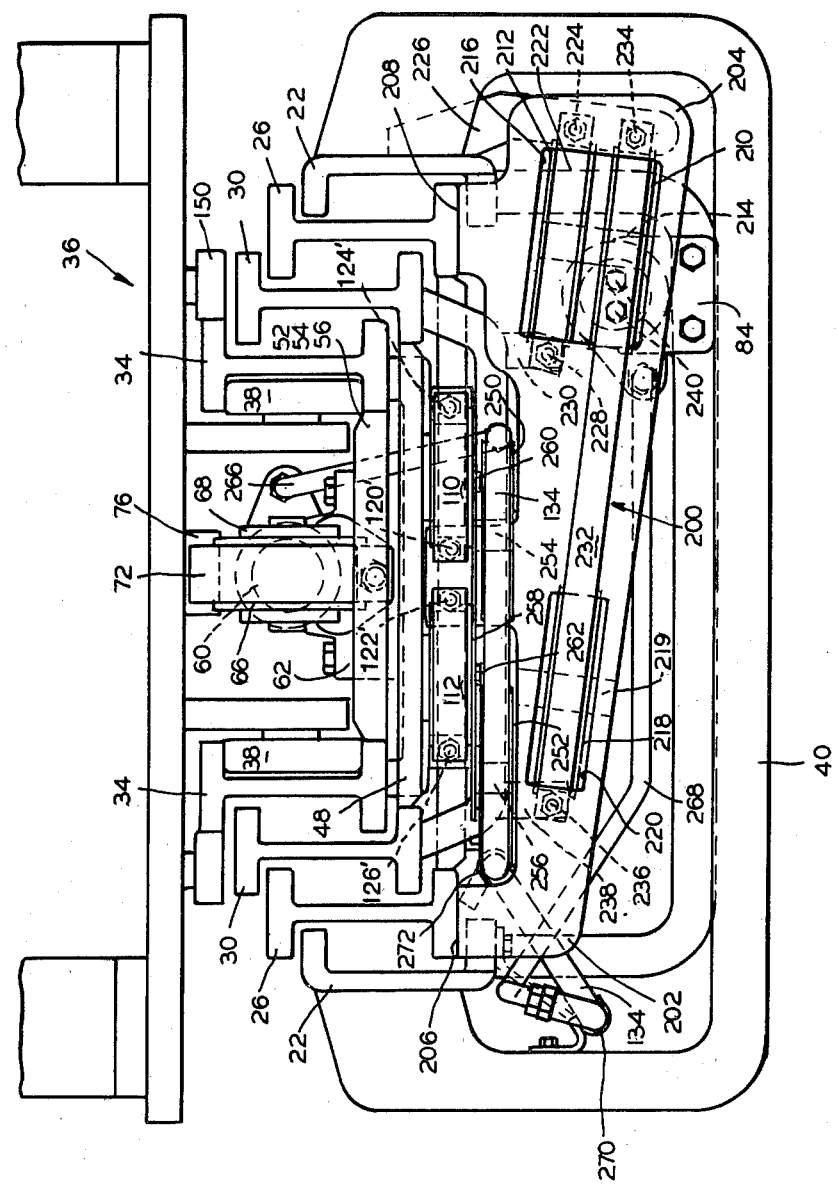
Figure 10:
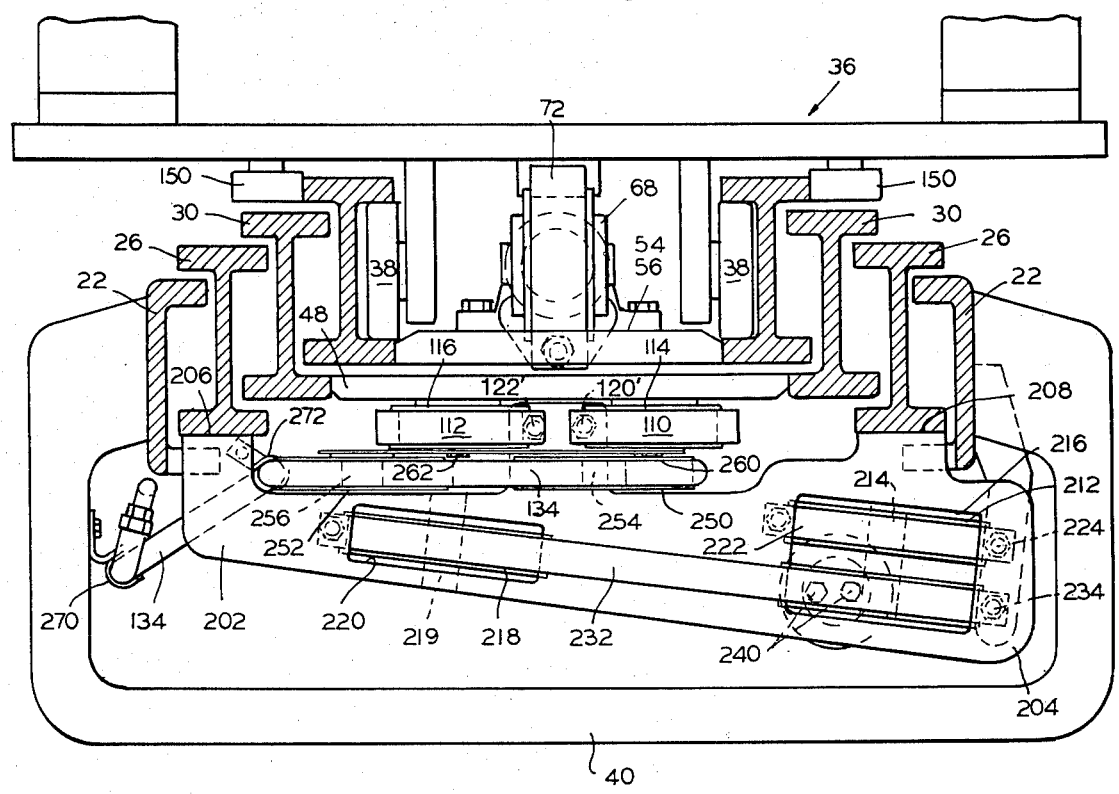
Figure 11:
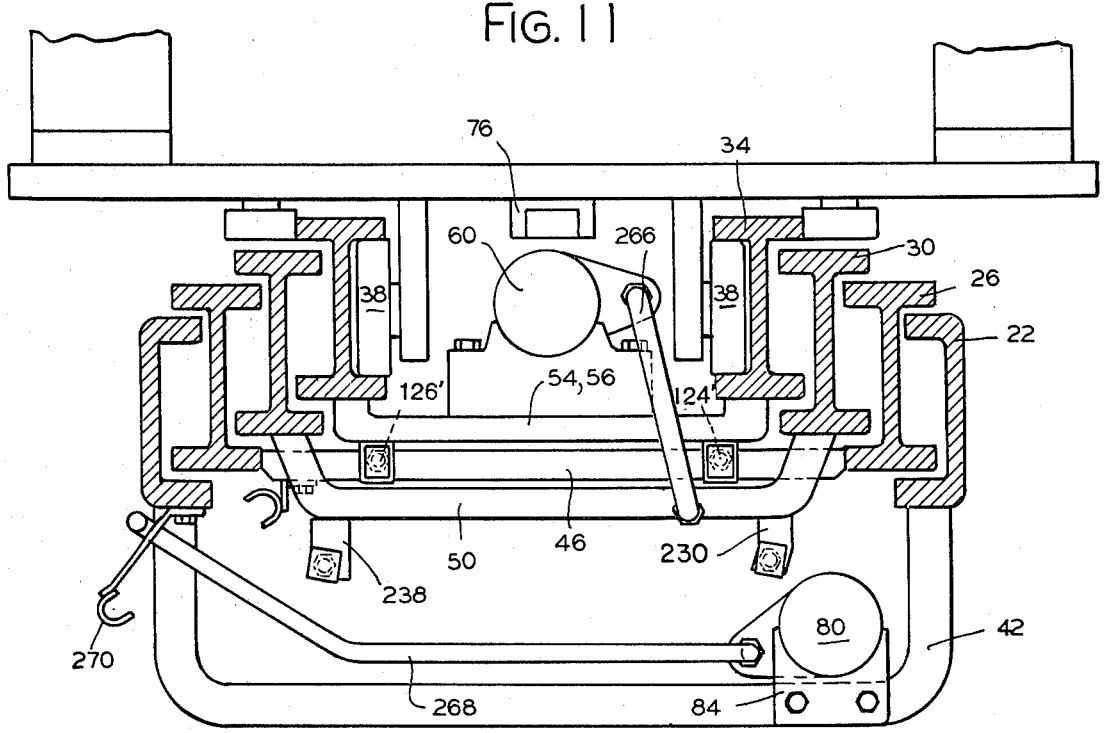
Figure 12:
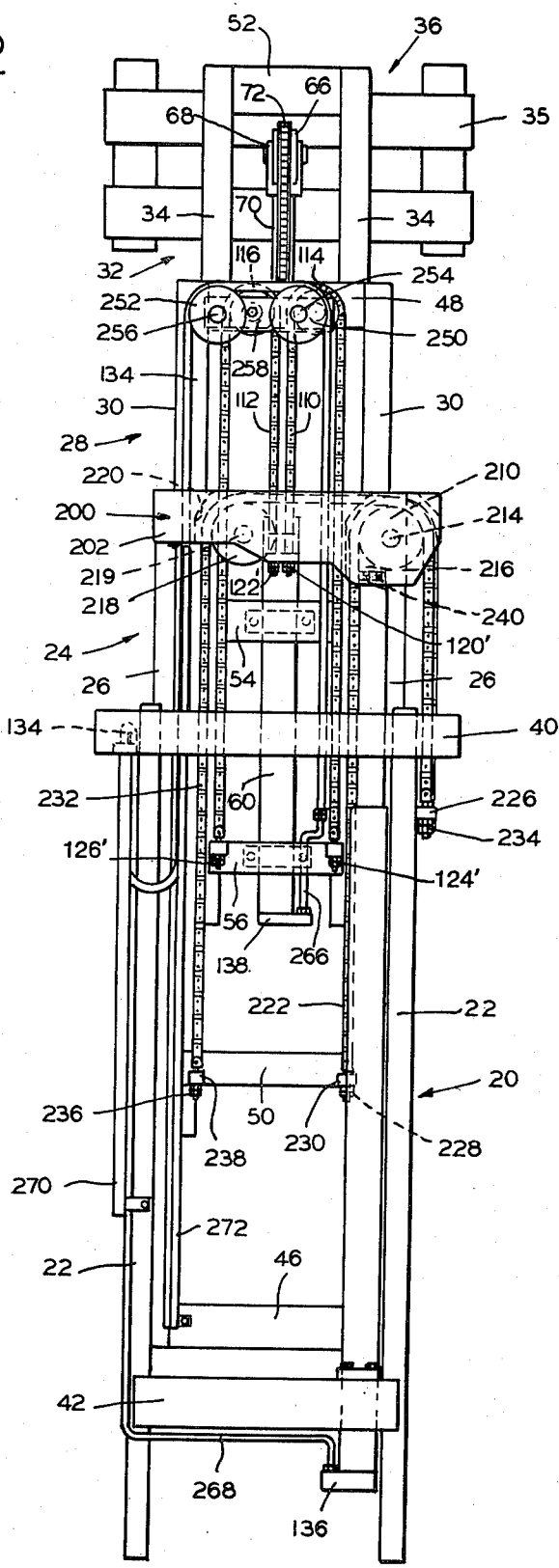
Figure 13:
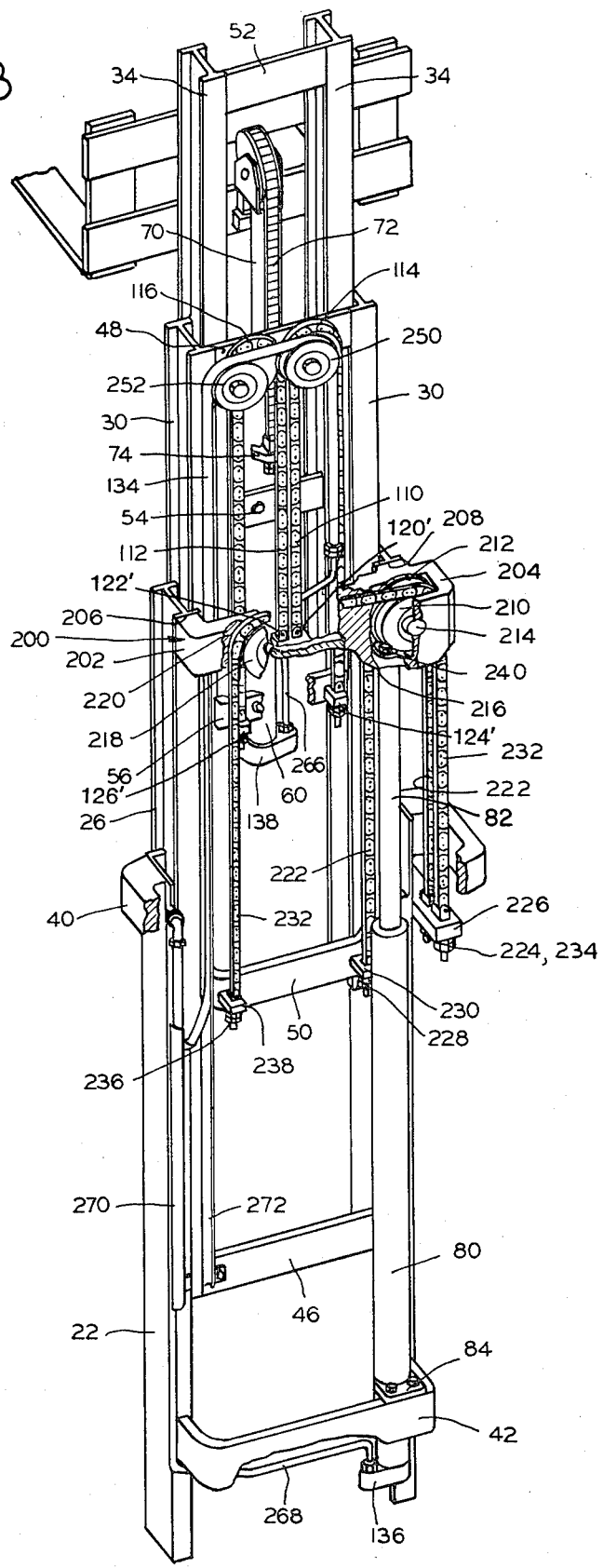

As can be seen in FIG. 1, the adjacent end portions of the two housing members 1 are arranged at a spacing from each other in the region of the joint between the two rail sections, and the housing members 1 are connected together in this region as will be subsequently described. The two conductor strips 2 project for short distances from the ends of the associated housing members 1 and are connected together by two rectangular section metallic joining elements 31 and 32, each of the joining elements being inserted into generally rectangular section receiving spaces of the two conductor strips. A clamping screw 33 is threadedly engaged in the joining element 31 and is adjusted downwardly against the joining element 32 so as to urge the elements apart and press them against upper and lower transversely extending limbs of the conductor strip thereby to lock the conductor strips together.

To firmly but releasably interconnect the housing member 1 in a defined relationship, and to additionally cover the exposed portions of the conductor strips 2 and joining elements 31 and 32, the conductor rail incorporates housing member connecting means in the form of two shell elements 4 and 5 of electrically insulating material which cooperate to enclose the end portions of the two housing members 1 and the region therebetween, but which leave free the openings 3 of the housing members. The two shell elements 4 and 5 are detachably fastened together by means of two screws 6 and 7.

The shell elements 4 and 5 are in cross-section at least partially adapted to the external outline of the housing members 1 and each include at least one longitudinal edge or corner portion 8. Arranged in the interior of each shell element in the region of the corner portion 8 thereof are two spaced apart ribs 9, which extend in transverse planes of the shell element and which each engage in a corresponding milled groove 10 in a respective one of the two housing members 1. The engagement of the ribs 9 in the grooves 10 ensures that the housing members 1 are firmly interconnected by the two shell elements 4 and 5 and in particular are so connected as to be substantially secure against relative rotational movement and relative axial and lateral displacement.

In place of the ribs 9, which also act as stiffening fillets, there could be provided spigots engageable in corresponding bores in the housing members.

The connecting means composed of the shell elements 4 and 5 and the fastening screws 6 and 7 thus provides a firm interconnection of the housing members 1 in the region of the joint between the two rail sections and additionally protects the otherwise uninsulated conductor strip and joining element portions from being accidentally contacted.

I claim:

1. Connecting means for releasable interconnection of two correspondingly shaped, downwardly open housing members respectively of two conjoined sections of an electric current conductor rail, said connecting means comprising two shell elements which are interconnectible to enclose mutually adjacent end portions of said two housing members over an area spaced away from downward openings of the housing members and fastening means for detachably fastening said shell elements together around said housing member end portions, each of said shell elements having a cross-sectional shape at least partially adapted to an external profile of a respective half of the housing cross-section and each of said shell elements being provided with at least two locating projections each extending in a respective cross-sectional plane of the associated shell element to be engageable in a corresponding recess in a respective one of said housing members.

2. Connecting means according to claim 1, wherein each of said shell elements comprises at least one corner portion extending perpendicularly to said cross-sectional planes, said two locating projections of each said shell element being arranged in the region of said corner portion.

3. Connecting means according to claim 1, wherein each of said locating projections is a rib.

4. Connecting means according to claim 1, wherein each of said locating projections is a spigot.

5. An electric current conductor rail comprising two correspondingly shaped downwardly open housing members each forming part of a respective one of two conjoined sections of said rail and each being provided at an end portion thereof adjacent the respective other housing member with means defining at least two recesses, current conductor means extending in said housing members, and connecting means releasably connecting said housing members together, said connecting means comprising two shell elements arranged to enclose said end portions of said housing members apart from the downward openings thereof, and fastening means detachably fastening said shell elements together, each of said shell elements having a cross-sectional shape at least partially adapted to the external profile of a respective half of the housing member cross-section and each of said shell elements being provided with at least two locating projections each extending in a respective cross-sectional plane of the associated shell elements and engaged in a respective one of said housing member recesses.

6. A conductor rail according to claim 5, wherein each of said shell elements comprises at least one corner portion extending perpendicularly to said cross-sectional planes, said two locating projections of each of said shell elements being arranged in the region of said corner portion thereof.

7. A conductor rail according to claim 5, wherein each of said recesses is a groove and each of said locating projections is a rib.

8. A conductor rail according to claim 5, wherein each of said recesses is a bore and each of said locating projections is a spigot.

9. An electric current conductor rail comprising two conductor strips of metallic material, each conductor strip having a cross-section being approximately Z-shaped, said Z-shaped cross-section having transverse limbs at the upper and lower extremities, at least one of the two transverse limbs at the upper and lower extremities of said cross-section having an external surface being inwardly curved, two downwardly open housings of electrically insulating material defining interior hollow spaces of substantially rectangular cross-section each for receiving one of said conductor strips, each interior hollow space having a greater cross-sectional height than that of each conductor strip and each housing further defining retaining means for retaining each conductor strip in each interior space, each housing further defining a respective recess arranged at each vertical side of each interior hollow space directly adjacent to the portion of said interior hollow space occupied by said conductor strip, said recesses being aligned in a transverse plane of said interior hollow space, each housing and conductor strip having an end portion adjacent the other housing and conductor strip, connector means interconnecting said conductor strips at said adjacent ends thereof, and a connector for interconnecting adjacent ends of said housings, said connector comprising two shell members which are engageable with each other to enclose said end portions of said housing member over an area spaced from a downward opening of each downwardly open housing, fastening means detachably connecting said shell members together around said housing end portions, each shell member having a cross sectional shape at least partially corresponding to an external profile of a respective half of said housing end portions and each of said shell members being provided with at least two spaced ribs extending inwardly toward each housing end portion, each housing end portion having at least one slot for receiving each respective rib.

10. An electric current conductor rail according to claim 9, wherein said fastening means comprise a pair of screws extending through upper portions of each shell member opposite each downwardly extending opening of each housing.

* * * * *